United States Patent Office 3,313,939
Patented Apr. 11, 1967

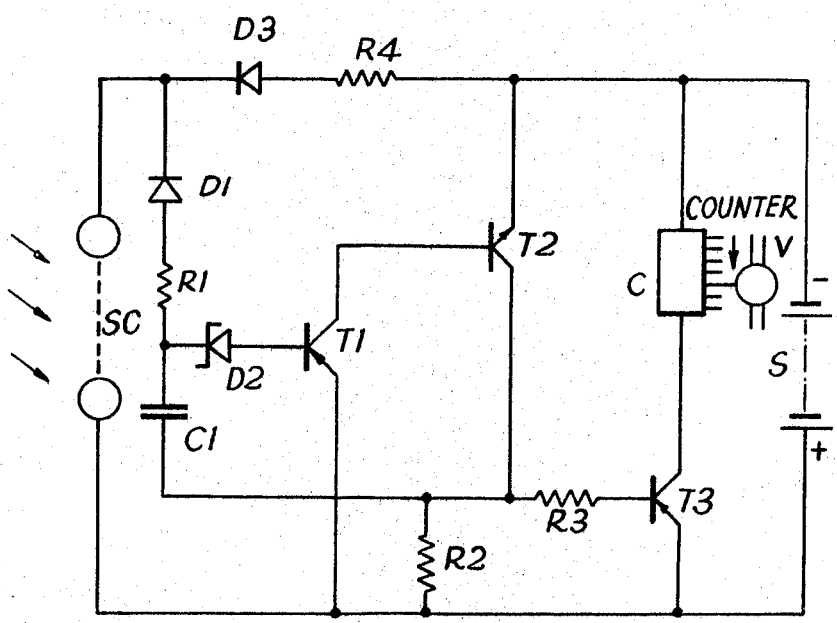

3,313,939
CONTROL DEVICES RESPONSIVE TO SOLAR RADIATION
Herbert Cyril Spencer, Taplow, England, assignor to British Telecommunications Research Limited, Taplow, England, a British company
Filed Dec. 17, 1963, Ser. No. 331,290
Claims priority, application Great Britain, Dec. 20, 1962, 48,165/62; Feb. 13, 1963, 5,891/63
4 Claims. (Cl. 250—212)

The present invention relates to control devices responsive to solar radiation and is more particularly concerned with arrangements for effecting a switching operation dependent on the total amount of solar radiation over an extended period and dependent also on its intensity.

It has been established that the moisture requirements of plants are related, at any rate roughly, to the amount of sun to which they are subjected and where the water supply to the crops is almost entirely artificial in the sense that it is in the form of irrigation canals or the like, it is important from an economic point of view that the amount of water supplied should be roughly commensurate with the need for it as determined by the amount of sun to which the plants have previously been subjected. By this means it is possible to make more economic use of the water resources available and in some countries this may be a very valuable contribution towards cheaper agricultural production.

The chief object of the invention is to meet a situation of this sort by the provision of a simple device responsive to solar radiation which may then control some other requirement bearing a relationship thereto, for instance the supply of water.

According to the invention, use is made of a converter for converting solar radiation into electrical energy and this energy is then stored until a predetermined level is reached. Conveniently, the storage device is in the form of a high-value capacitor which is charged to a predetermined voltage whereupon an impulse is produced to advance a counting device one unit or step. This device, after completing a predetermined number of steps, serves to effect a switching operation, for instance in the circumstances suggested to control a water valve or give an alarm so that suitable manual action may be taken. The electrical power generated by the solar cells also serves to charge a storage battery which then ensures that electric power is available for operation of the equipment even in the absence of sunlight. The use of a counting device is not essential but will generally be convenient as it avoids the use of an unduly large capacitor and permits the water controlling operations to take place at comparatively long intervals.

The invention will be better understood from the following description of one method of carrying it into effect which should be taken in conjunction with the accompanying drawing. This shows the detailed circuit of an arrangement operating on the basis just described, namely that an assembly of solar cells produces power to charge a capacitor which on attaining a predetermined voltage operates a counter.

The solar converter SC which may be of well-known type is indicated on the left of the drawing and is arranged to charge the battery S on the right by way of the rectifier D3 and resistor R4. This latter may be of a value such that the drop therein is of the same order as the voltage of the battery. The output from the solar converter also serves to charge the capacitor C1 which is of high value and most conveniently of the electrolytic type.

When the capacitor C1 has been charged to a predetermined voltage, the Zener diode D2 conducts and accordingly base current is connected to transistor T1. This, in association with the opposite type transistor T2, forms a mono-stable pair which now conducts, whereupon the capacitor C1 is discharged and current flow takes place through the resistor R2. This has the effect of driving the base of transistor T3 negative, in consequence of which it conducts and passes sufficient current to operate the counter C. The transistors are only conducting for a short time which is sufficient to secure satisfactory operation of the counter and the circuit then reverts to its original condition and a charge again builds up on capacitor C1 in response to solar radiation.

The counter may be any suitable counting device, for instance an electronic ring counter, preferably arranged as indicated to provide a plurality of outputs successively, any one of which may be employed for controlling a switching operation. Use may also be made of an electromagnetically-operated pawl and ratchet device such as is employed in telephone systems as a subscriber's meter. This can readily be arranged to close contacts after any given predetermined number of steps and arrangements may also be provided, if desired, whereby the closing of these contacts completes a self-interrupted driving circuit for the counter so that it is restored to its original position where this driving circuit is opened by further contacts. At further alternative is to make use of a so-called uniselector of the type employed in telephone systems.

The closing of the contacts after a predetermined number of steps may be arranged to sound an alarm in case any subsequent action needs to be taken manually and in this case the attendant may also perform some operation which silences the alarm and restores the counter to normal. Alternatively, the control circuit may actually directly initiate the operation of an electrically controlled water valve V so as to allow a predetermined amount of water into an irrigation system. On the restoration of the counter, all the circuits are restored to the initial position and a further count is started, dependent as before on the amount of solar radiation.

Referring again to the circuit diagram, the diode D3 serves to prevent the battery S from discharging through the solar converter in the absence of sunlight and similarly diode D1 prevent capacitor C1 discharging through the solar converter when it is not generating. Diode D2, in addition to controlling the voltage at which transistors T1 and T2 conduct, also prevents additional charge on C1 due to the leakage currents of these transistors. It will be appreciated that since none of the transistors is conducting except while an operation of the counter is taking place, there is no current drain at a time when no solar energy is being received.

Satisfactory operation was obtained with component values as follows: R1, ½ megohm; R2 and R3, 39 ohms; R4, 470 ohms; and C1, 600 mf.

If required a voltage converter may be inserted between the solar converter and the control equipment to provide suitable voltage values but in most cases the need for this can be avoided by suitable choice of the voltage of the battery and the number of cells in the solar converter.

The invention accordingly provides a small self-contained unit which gives a control effect in accordance with the total value of solar radiation and may therefore be employed very advantageously for controlling operations which need to be performed to correspond roughly with this total.

I claim:

1. A control device responsive to a predetermined amount of solar radiation comprising in combination, a device for converting solar radiation into electrical energy, a capacitor, a transistor having base, emitter and collector electrodes, means for charging said capacitor from the output of said device, a Zener diode connected between one terminal of said capacitor and the base of said transistor, and a load device connected in the collector circuit of said transistor, whereby when said capacitor is charged to a predetermined voltage due to a predetermined total amount of solar radiation falling on said device, said Zener diode conducts and biases the base of said transistor to cause current flow in the emitter-collector circuit of said transistor to activate said load device and effect a control switching operation.

2. A control device as claimed in claim 1 including a counter operated to successive positions due to current flow in the emitter-collector circuit of said transistor and means controlled by said counter after a predetermined number of operations for effecting a control switching operation.

3. A control device responsive to a predetermined amount of solar radiation, comprising in combination, a device for converting solar radiation into electrical energy, a rechargeable battery connected to said device so as to be charged thereby when said device is energised by solar radiation, a capacitor, a first resistor having one terminal connected to one terminal of said capacitor, a second resistor of much lower value having one terminal connected to the other terminal of said capacitor, connections from the other terminals of said first and second resistors respectively to opposite poles of said device whereby said capacitor is charged by said device in series with said first and second resistors when said device is energised by solar radiation, first, second and third transistors each having base, emitter and collector electrodes, a Zener diode connected between the junction of said capacitor and said first resistor and the base of said first transistor, a connection from the collector of said first transistor to the base of said second transistor, a connection from the emitter of said second transmitter to one pole of said battery, a connection from the emitter of said first transistor to the other pole of said battery, a connection from the collector of said second transistor to said other pole of said battery in series with said second resistor, a connection from the collector of said second transistor to the base of said third transistor and a load device connected in the emitter-collector circuit of said third transistor across said battery whereby when said capacitor is charged to a predetermined voltage due to a predetermined total amount of solar radiation falling on said device, said Zener diode conducts and biases the base of said first transistor which thereupon conducts and discharges said capacitor through said second resistor and causes said second transistor to conduct whereupon the base of said third transistor is biassed to cause said third transistor to conduct and activate said load device and effect a control switching operation.

4. An irrigation control device for effecting the supply of a predetermined amount of water to vegetation in response to a predetermined amount of solar radiation falling thereon, comprising in combinaiton, a device located adjacent said vegetation for converting solar radiation into electrical energy, a rechargeable battery connected to said device so as to be charged thereby when said device is energised by solar radiation, a resistor, a capacitor connected so as to be charged from said device in series with said resistor, a transistor having base, emitter and collector electrodes, a Zener diode connected between the junction of said resistor and said capacitor and the base of said transistor, and a valve controlling the supply of water to said vegetation and operated due to current flow in the emitter-collector circuit of said transistor whereby when said capacitor is charged to a predetermined voltage due to a predetermined total amount of solar radiation falling on said device, said Zener diode conducts and biases the base of said transistor to cause current flow in the emitter-collector circuit of said transistor and hence the operation of said valve to supply water to said vegetation.

References Cited by the Examiner

UNITED STATES PATENTS

| | | | |
|---|---|---|---|
| 2,901,669 | 8/1959 | Coleman | 250—212 X |
| 3,127,552 | 3/1964 | Stead | 250—212 X |
| 3,156,827 | 11/1964 | Porteous et al. | 250—214 |
| 3,159,755 | 12/1964 | Duncan | 307—88.5 X |
| 3,222,661 | 12/1965 | Vasel et al. | 307—88.5 |
| 3,224,676 | 12/1965 | Rauchwerger | 250—206 X |

WALTER STOLWEIN, *Primary Examiner.*